United States Patent [19]

Nishihara

[11] Patent Number: 5,506,698
[45] Date of Patent: Apr. 9, 1996

[54] IMAGE REPRODUCING APPARATUS AND PROCESS WHEREIN MINIMIZED AVERAGE ERROR TECHNIQUE IS USED FOR EACH OF FRACTIONS OF ORIGINAL PEL INTENSITY VALUE

[75] Inventor: Masahiro Nishihara, Nagoya, Japan

[73] Assignee: Brother Kogyo Kabushiki Kaisha, Nagoya, Japan

[21] Appl. No.: 310,705

[22] Filed: Sep. 22, 1994

[30] Foreign Application Priority Data

Sep. 28, 1993 [JP] Japan .................. 5-240868

[51] Int. Cl.$^6$ .................. H04N 1/405
[52] U.S. Cl. .................. 358/455; 358/456; 358/458; 358/465; 345/147
[58] Field of Search .................. 358/447, 448, 358/455, 456, 458, 465, 466; 382/270; 345/147

[56] References Cited

FOREIGN PATENT DOCUMENTS 3-18177  1/1991  Japan .

OTHER PUBLICATIONS

"Image from computers", M. R. Schroeder, Bell Telephone Laboratories, Inc., *IEEE SPECTRUM* 1969, pp. 66–78.

"A Survey of Techniques for the Display of Continuous Tone Pictures on Bilevel Displays", J. F. Jarvis et al., *Computer Graphics and Image Processing 5*, 1976, pp. 13–40.

*Primary Examiner*—Scott A. Rogers
*Attorney, Agent, or Firm*—Oliff & Berridge

[57] ABSTRACT

Apparatus and process for reproducing apparatus capable of reproducing a source image, wherein an original intensity value determined on the basis of an intensity at each picture element under consideration of the source image is quantized to one of two levels by comparison of the original intensity value with a threshold value, using a minimized average error technique, and wherein the original intensity value at each picture element under consideration is divided into a plurality of fractions, and each of the is quantized to one of two levels, with the minimized average error technique being practiced for each fraction.

15 Claims, 5 Drawing Sheets

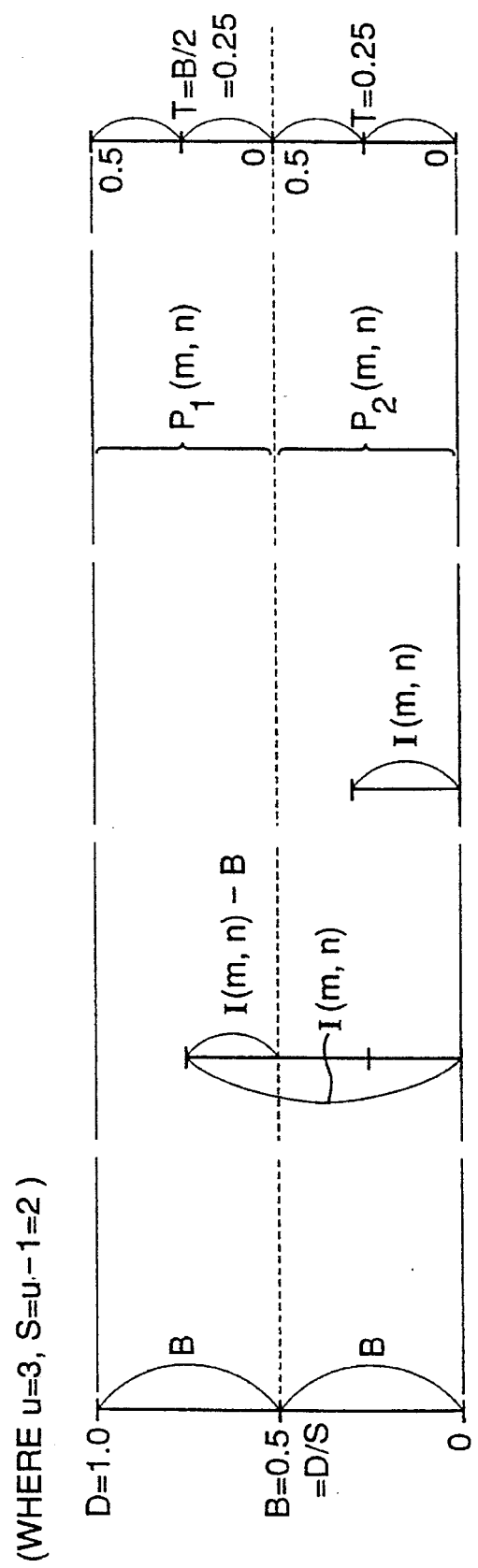

IMAGE REPRODUCING APPARATUS AND PROCESS WHEREIN MINIMIZED AVERAGE ERROR TECHNIQUE IS USED FOR EACH OF FRACTIONS OF ORIGINAL PEL INTENSITY VALUE

BACKGROUND OF THE INVENTION

1. Field of the Invention

The present invention relates in general to an image reproducing system utilizing a so-called "minimized average error" technique in quantization of multilevel original intensity values at picture elements of a source image. More particularly, this invention is concerned with improvements in image reproducing apparatus and process wherein the original intensity value at each of the picture elements (usually called "cells" or "pels") is divided into a plurality of fractions corresponding to divisions of the maximum value of the intensity value, and wherein the minimized average error technique is practiced for each of those fractions.

2. Discussion of the Related Art

In the field of image reproduction, an image processing technique is known for providing a gray scale or "halftone" picture on a bilevel display or other output device, with one of two levels ("on" and "off"; "black" and "white"; or "bright" and "dark"), in which a multilevel input image signal is compared with a threshold value. That is, the multilevel input image signal is quantized into a bilevel output image signal, using the suitably determined threshold value. For improved reproduced image quality, the threshold value used for each picture element under consideration is determined by either the original intensity value alone at that picture element under consideration, or both this original intensity value and the previously determined intensity values at the picture elements in the neighborhood of the picture element under consideration.

The well known "minimized average error" technique is a typical example of the latter method in which the intensity values at the neighboring picture elements are also considered in determining the intensity value at the picture element in question. This technique was based on a technique disclosed by M. R. Schroeder, Bell Telephone Laboratories, Inc., in his article "Images from computers", IEEE SPECTRUM, March 1969, which refers to "local spatial averages of brightness". The "brightness" correspond to the "intensity" indicated above. Some years later, J. F. Jarvis et al. improved the technique proposed by M. R. Schroeder, as "minimized average error" technique or approach, which is disclosed in "A Survey of Techniques for the Display of Continuous Tone Pictures on Bilevel Displays", COMPUTER GRAPHICS AND IMAGE PROCESSING 5, 13–40 (1976), BELL LABORATORIES. The "minimized average error approach" is to choose successive values Pxy of the displayed intensity in such a way as to minimize the accumulated error between the original and display images.

Described in detail by reference to FIG. 3 wherein a picture element under consideration whose intensity value is to be determined is indicated by a hatched square block, intensity error values $E(k, l)$ at the neighboring picture elements whose intensity values have been already determined are used to determine or correct the intensity value at the picture element under consideration. The intensity error values $E(k, l)$ are utilized in the form of a weighted accumulated average $A(m, n)$ which is obtained by using an appropriate weighting matrix W as illustrated in FIG. 4, according to the following equation (1):

$$A(m, n) = (1/\Sigma W(k, l)) \cdot \Sigma W(k, l) \cdot E(k, l) \quad (1)$$

Using the weighted average $A(m, n)$ of the intensity error values $E(k, l)$, a corrected image intensity value $P(m, n)$ at the picture element under consideration is obtained according to the following equation (2):

$$P(m, n) = A(m, n) + I(m, n) \quad (2)$$

where, $I(m, n)$: non-corrected or original image intensity value

The corrected image intensity value $P(m, n)$ is compared with a predetermined threshold value, which is usually equal to D/2, to determine whether an image dot should be placed at the picture element under consideration, namely, whether that picture element should be turned "on". "D" represents the maximum value possible of the original intensity $I(m, n)$. If the maximum value R is equal to "1", the threshold value is equal to "0.5". In this case, if $P(m, n) \geq 0.5$, then the picture element is turned "on" else the picture element is turned "off".

The intensity error at the picture element under consideration is determined according to the following equations (2) and (3):

$$\text{If } P(m, n) \geq 0.5, \text{ then } E(m, n) = P(m, n) - 1 \quad (2)$$

$$\text{If } P(m, n) \leq 0.5, \text{ then } E(m, n) = P(m, n) \quad (3)$$

The above procedure is repeated for all the picture elements corresponding to the source image or original image, to determine whether the individual picture elements should be turned "on" or "off", to reproduce the source image on an appropriate output device such as a display device or a printer.

The principle of the "minimized average error" technique, which has been described above, is effectively applicable to a bilevel output device which has two output levels at each picture element. On the other hand, some output devices are known, which are adapted to reproduce the source image in one of three output levels at each picture element according to a multilevel output image signal, by means of pulse width modulation or power amplitude modulation. For instance, a printer is available capable of reproducing the source image, with three to sixteen output levels at each picture element. However, the minimized average error technique has not been suitably applicable to such multilevel output device. In view of this drawback, an improvement is proposed as disclosed in JP-A-3-18177 (Laid-open Publication of unexamined Japanese Patent Application published in 1991), wherein two or more threshold values (e.g., three threshold values) are used to quantize a multilevel input image signal into a multilevel output image signal (e.g., eight output levels), following minimized average error approach.

Like the bilevel image reproducing system wherein the bilevel output image signal is used, however, the multilevel image reproducing system suffers from an undesirable dummy image areas or blur in the reproduced image, which deteriorate the image reproduction quality, as experienced on the conventional image reproducing systems using the minimized average error technique.

SUMMARY OF THE INVENTION

It is therefore a first object of the present invention to provide an image reproducing apparatus capable of quantizing an original or input image signal into a multilevel output image signal using the minimized average error technique, which apparatus permits significant reduction of the conventionally experienced undesirable dummy image areas in the reproduced image, and assure improved image reproduction quality.

It is a second object of the present invention to provide a process of reproducing a source image according to a multilevel output image signal obtained from an input image signal, utilizing the minimized average error technique, which process permits significant reduction of the undesirable dummy image areas in the reproduced image.

The first object indicated above may be achieved according to one aspect of the present invention, which provides an image reproducing apparatus capable of reproducing a source image, wherein an original intensity value determined on the basis of an intensity at each picture element under consideration of the source image is quantized to one of two levels by comparison of the original intensity value with a threshold value, using a minimized average error technique wherein an intensity error between the original intensity value and the one of two levels influences quantization of original intensity values at other picture elements in the neighborhood of each picture element under consideration, the apparatus comprising: (a) dividing means for dividing the original intensity value at each picture element under consideration, into a plurality of fractions; and (b) quantizing means for quantizing each of the plurality of fractions to one of two levels, with the minimized average error technique being practiced for each fraction.

In the present image reproducing apparatus constructed as described above, the original intensity value at each picture element under consideration of the source image is divided into two or more fractions by the dividing means, and the minimized average error technique is used by the quantizing means for quantization of each of the fractions of the original intensity value at each picture element under consideration. A bilevel image signal thus obtained by the quantizing means may be suitably used to obtain a multilevel output image signal, which permits significant reduction of the conventionally experienced undesirable dummy image areas or blur in the reproduced image.

The dividing means is preferably adapted to obtain the plurality of fractions of the original intensity value, which correspond to respective equal or unequal divisions of a maximum value possible of the original intensity value. For instance, where the maximum value of the original intensity value is equal to "1", the original intensity value of "0.8" for example is divided into two equal fractions, for example, one fraction being "0.5" and the other fraction being "0.3". In this case, the previously obtained average intensity error at the neighboring picture elements is added to "0.5" and "0.3" according to the minimized average error technique before the sums are compared with a threshold value of "0.25", to determine whether the sums are quantized to one of two levels, "0.5" and "0". In this specific case, "0.5" is obtained by the quantizing means, for both of the two fractions "0.5" and "0.3", provided the average intensity error is a positive value, since the sums are larger than the threshold value of "0.25". Thus, the quantizing means obtains a total output level of "1.0" (=0.5+0.5). However, the total output level may be "0" (=0+0) where "0" is obtained for both of the two fractions "0.5" and "0.3", while the total output level may be "0.5" (=0+0.5) where "0" and "0.5" are obtained for the two fractions, respectively. Accordingly, the input image signal is converted into a multilevel output image signal. Namely, the output intensity at the picture element under consideration is determined as one of three levels, "0", "0.5" and "1.0".

The image reproducing apparatus may further comprise an optical display device for displaying an output image according to the output levels obtained by the quantizing means for each of the plurality of fractions of the original intensity value at each picture element under consideration. Alternatively, the apparatus may comprise a recording device for producing an output image on a recording medium according to the output levels obtained by the quantizing means for each of the plurality of fractions of the original intensity value at each picture element under consideration. For example, the recording device may be an ink-jet printer capable of jetting an droplet of an ink corresponding to each picture element under consideration, such that a size of the droplet is variable in a plurality of steps.

In one advantageous form of the invention, the apparatus comprises: an image reader generating gray scale data representative of the intensity at each picture element under consideration of the source image; and converting means for converting the gray scale data into the original intensity value within a predetermined range. The converting means may be adapted to convert the gray scale data into the original intensity value according to a linear or non-linear relationship between the intensity at each picture element under consideration and the original intensity value.

According to another advantageous form of the invention, the quantizing means comprises: weighting means for giving predetermined weights to respective the other picture elements in the neighborhood of each picture element under consideration; averaging means for obtaining a weighted average of the intensity errors at the other picture elements, by using the predetermined weights, for each of the plurality of fractions; converting means for obtaining a sum consisting of (a) each of the plurality of fractions of the original intensity value at each picture element under consideration and (b) the weighted average of the intensity errors obtained by the averaging means for each fraction, and quantizing the sum into one of two predetermined quantities by comparison of the sum with a predetermined threshold value; and calculating means for calculating the one of two levels, on the basis of a sum of the quantities obtained by the converting means for the plurality of fractions of the original intensity value at each picture element under consideration. The weighting means may use the same weighting matrix which define a set of predetermined weights, for each of the plurality of fractions of the intensity value at each picture element under consideration, or may alternatively use different weighting matrices which define respective different sets of predetermined weights, respectively for the plurality of fractions of the original intensity value at each picture element under consideration, The second object indicated above may be achieved according to a second aspect of this invention, which provides a method of reproducing a source image, wherein an original intensity value determined on the basis of an intensity at each picture element under consideration of the source image is quantized to one of two levels by comparison of the original intensity value with a threshold value, using a minimized average error technique wherein an intensity error between the original intensity value and the one of two levels influences quantization of original intensity values at other picture elements in the neighborhood of each picture element under consideration, the method comprising the steps of: dividing the original intensity value at each picture element under consideration, into a plurality of fractions; and quantizing each of the plurality of fractions to one of two levels, with the minimized average error technique being practiced for each fraction. In the dividing step, the original intensity value may be divided into a plurality of fractions which correspond to respective divisions of the maximum value possible of the original intensity value.

The present image reproducing process has the same advantages as discussed above with respect to the apparatus constructed according the present invention.

BRIEF DESCRIPTION OF THE DRAWING

The above and other objects, features and advantages of the present invention will be better understood by reading the following detailed description of a presently preferred embodiment of the invention, when considered in connection with the accompanying drawings, in which:

FIGS. 7(a)-7(e) are an illustration for explaining two converted image intensity values P1(m, n) and P2(m, n) obtained in step S130 of the routine of FIG. 2.

DETAILED DESCRIPTION OF THE PREFERRED EMBODIMENT

Figure 1:
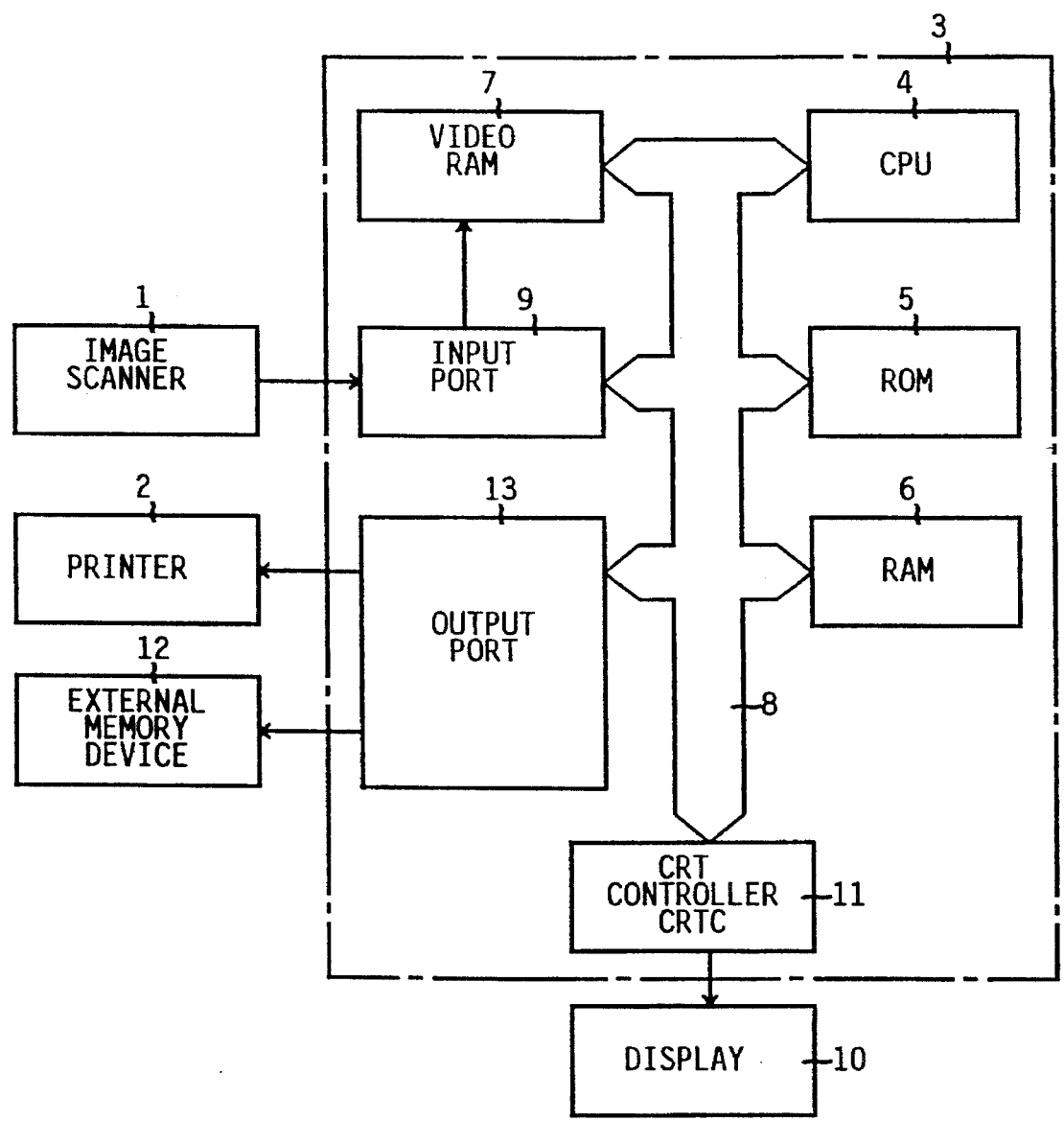
FIG. 1 is a schematic block diagram illustrating an image reproducing apparatus constructed according to one embodiment of this invention.

Referring first to the schematic block diagram of FIG. 1, there is shown an image reproducing apparatus adapted to reproduce a source image according to a multilevel output image signal obtained by conversion from an analog original image signal. The apparatus is provided with an image reader in the form of an image scanner 1, which reads the source image and and generates the analog original image signal, that is, gray scale data representative of the intensity at each picture element of the source image. The apparatus includes an electronic controller 3, which receives the original image signal from the image scanner 1, and processes the received original image signal into the multilevel output image signal used to control output devices in the form of an ink jet printer 2 and an optical display 10 such as a cathode ray tube.

The electronic controller 3 is constituted by a so-called microcomputer incorporating a central processing unit (CPU) 4, a read-only memory (ROM) 5, a random-access memory (RAM) 6, a video RAM 7, an input port 9, a CRT controller (CRTC), and an output port 13, which are interconnected through a data bus 8. The ROM 5 stores various control programs such as an image processing routine illustrated in the flow chart of FIG. 2. The original image signal received from the image scanner 1 is stored, as a digital multilevel input image signal, in the video RAM 7 through the input port 8. The display 10 is connected to the CRT controller 11, while the printer 2 and an external memory device 12 are connected to the output port 13.

The original analog image signal from the image scanner 1 is received by the input port 8, converted into the digital multilevel input image signal and stored in the video RAM 7, in a real-time manner. This digital input image signal stored in the video RAM 7 has multiple levels (e.g., 256 levels), which represent an original image intensity value I(m, n) at each picture element or pel (m, n) of the source image read by the image scanner 1. The original image intensity I(m, n) is held within a range between "0" and "1.0". That is, the maximum intensity value possible "D" at the picture elements is equal to "1.0". The "intensity" of the input image data stored in the video RAM 7 corresponds to the brightness at the corresponding picture element on the display 10, or the ink jet dot size at the corresponding picture element on a recording medium on the ink jet printer 2.

On the other hand, the multilevel output image signal obtained from the multilevel input image signal has three output levels corresponding to the intensity levels of "0", "0.5" and "1.0". The intensity value "1.0" is the maximum intensity value "D" of the input image signal as described above, and corresponds to the maximum size of the ink jet dot (maximum size of an ink droplet jetted from an ink jet head) of the printer 2. The intensity level "0.5" corresponds to a half of the maximum ink jet dot size, while the intensity value "0" corresponds to the absence of an ink jet dot or ink droplet at the corresponding picture element. Similarly, the intensity values "1.0" and "0.5" correspond to two different brightness or darkness values at the corresponding picture elements on the screen of the display 10, while the intensity value "0" corresponds to the zero brightness or darkness value. The printer 2 and the display 10 may be of a multi-color type. In this case, the image scanner 1 should be of a multi-color type capable of reading a multi-color source image.

Figure 2:
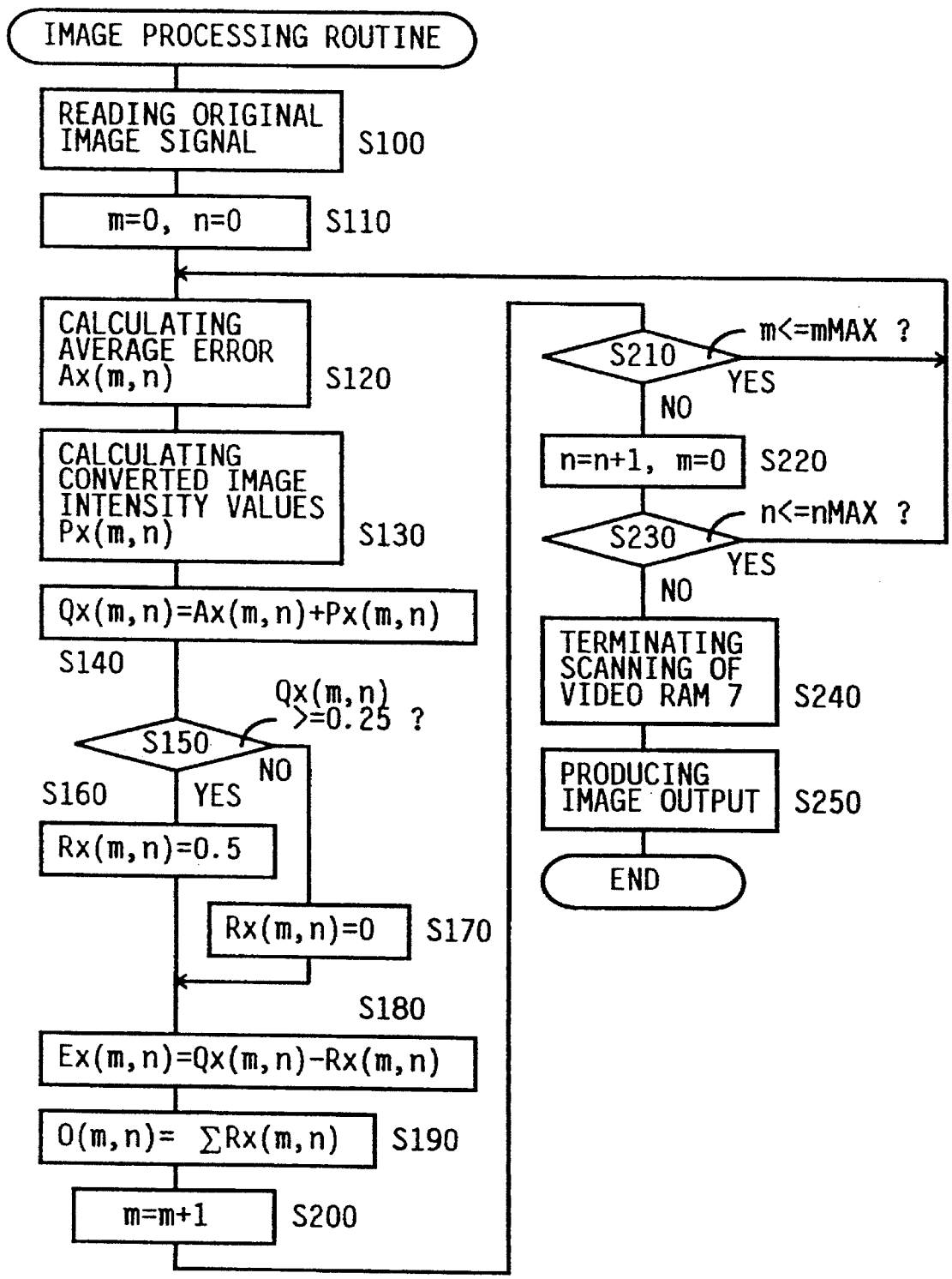
FIG. 2 is a flow chart showing an image processing routine executed by the apparatus of FIG. 1 for converting an input image signal into an output image signal.
Figure 3:
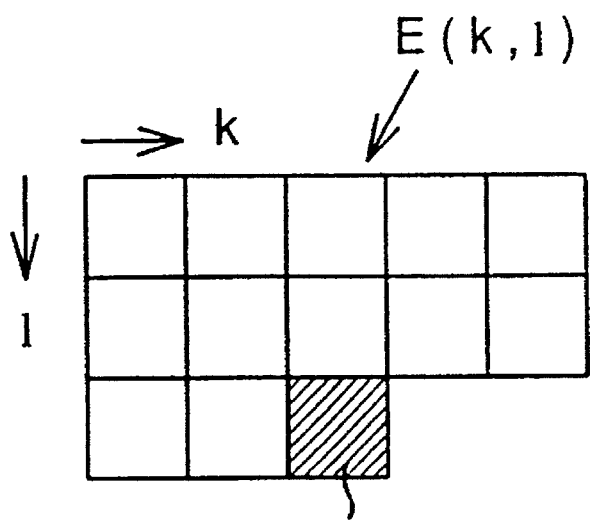
FIG. 3 is a view showing a picture element under consideration in quantizing the original image intensity to one of two levels of the output image intensity, and picture elements in the neighborhood of the picture element under consideration, which picture elements are used according to the minimized average error technique.
Figure 4:
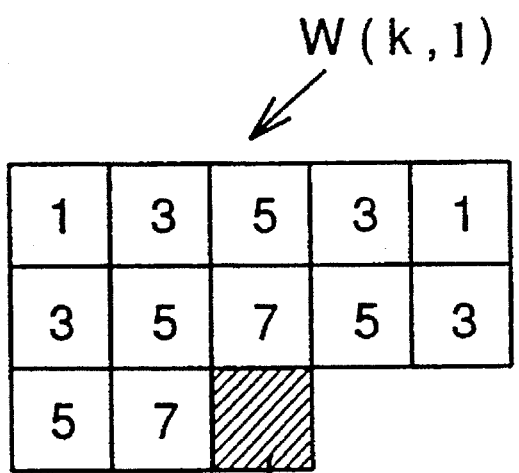
FIG. 4 is a view showing a matrix of weights given to the respective neighboring picture elements.

Referring next to the flow chart of FIG. 2, there will be described an operation of the present image reproducing apparatus to execute an image processing routine for converting the original image signal from the image scanner 1 into the multilevel output image signal.

The image processing routine is initiated with step S100 wherein the analog original image signal from the image scanner 1 is received through the input port 9, and converted into the digital multilevel input image signal, which represents the original image intensity value I(m, n) within the range between "0" and "1.0" (maximum value "D"), at each picture element (m, n) of the source image read by the image scanner 1. The input image signal converted from the original image signal is sequentially stored in the video RAM 7. During the signal conversion in this step S100, desired processing operations may be performed so that the input image signal stored in the video RAM 7 represents an enhanced output image as seen by the user or viewer of the printer 2 or display 10. For example, an adjustment of the apparent contrast of the output image is made using a parameter γ well known in the art. If the source image is a multi-color image, a suitable color compensation is effected for improved color reproduction of the output image.

The intensity represented by the analog original image signal or gray scale data from the image scanner 1 and the intensity represented by the digital multilevel input image signal stored in the video RAM 7 may have a linear or a non-linear relationship, which is suitably determined for improved reproduction of the source image.

Step S100 is followed by step S110 to commence a scanning operation of the video RAM 7, more specifically, reset the variables "m" and "n" to "0" to set a memory pointer in the RAM 7 to designate the first picture element in the first row (i.e., picture element in the first row and first column). Then, steps S120 through S190 are implemented as described below in detail, to obtain an output image intensity O(m, n) at the designated picture element, on the basis of the original image intensity I(m, n) stored at the corresponding position (m, n) in the RAM 7, and according to the principle of the present invention.

Figure 5:
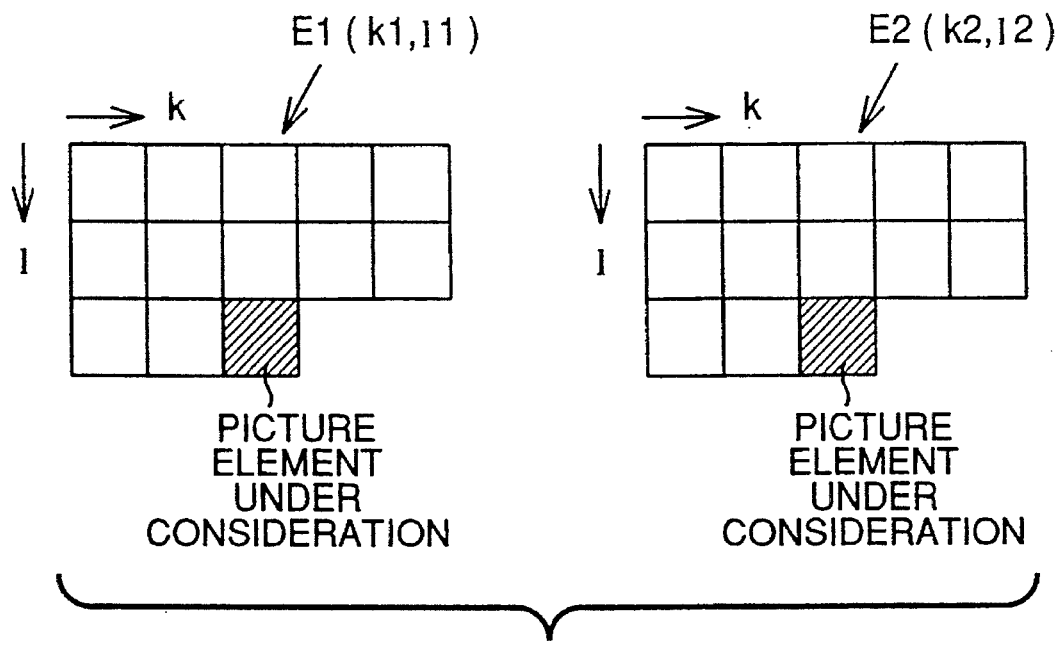
FIG. 5 are views showing the picture element under consideration and the neighboring picture elements whose intensity errors are used in the routine of FIG. 2.
Figure 6:
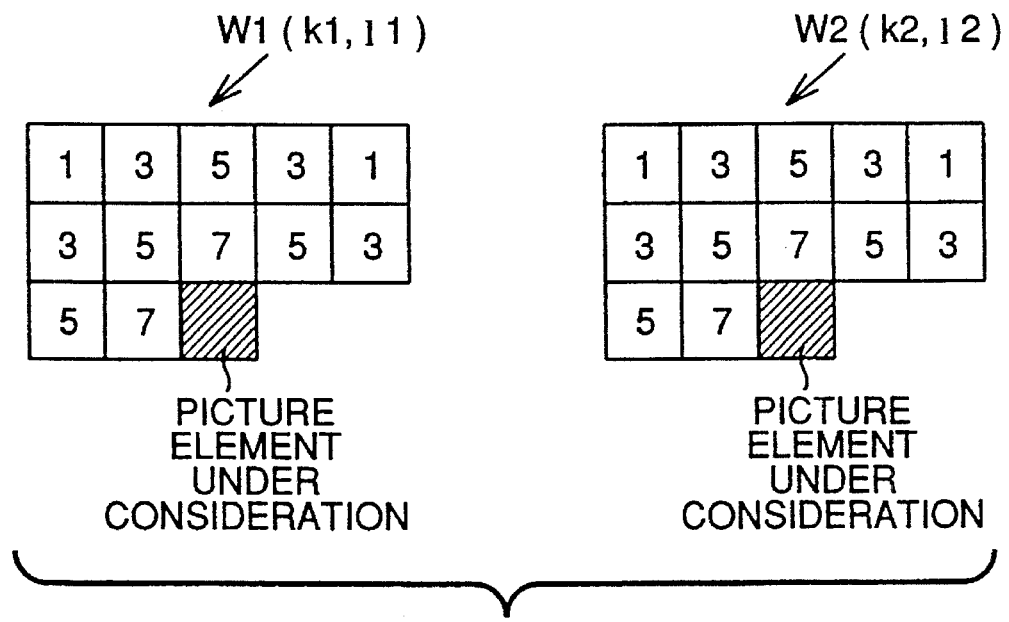
FIG. 6 are views showing matrices of weights given to the respective neighboring picture elements shown in FIG. 5.

Steps S120–S190 are repeatedly implemented for all of the picture elements whose original intensity values I(m, n) are stored in the video RAM &. For this purpose, steps S200, S210, S220 and S230 are provided to increment the variables "m" and "n" until the variables are increased to their maximum values mMAX and nMax, as m=0, 1, . . . , mMAX, and n=0, 1, . . . , nMAX. The size of the source image matrix is determined by mMAX and nMAX. In the following description, the picture element (m, n) indicated by hatched square in FIGS. 5 and 6 is considered. This picture element will be referred to as the "picture element under consideration".

In step S120, weighted average intensity error values Ax(m, n) corresponding to the picture element (m, n) under consideration are obtained according to the above equation (1), on the basis of previously obtained intensity error values Ex(kx, lx) at the 12 picture elements in the neighborhood of the picture element under consideration, and weighting matrices Wx(kx, lx). The 12 neighboring picture elements are indicated by non-hatched squares in FIG. 5, while the weighting matrices Wx(kx, lx) are indicated in FIG. 6. The manner of obtaining the intensity error values Ex(kx, lx) at these 12 neighboring picture elements will become apparent by reading the following description on the manner in which the intensity error value Ex(m, n) at the picture element under consideration is obtained in step S180.

The value "x" as in Ax(m, n), Ex(kx, lx), Wx(kx, lx) and Ox(m, n) depends upon the number "u" of the output levels of the output image signal. Described more precisely, x=1, . . . , (u −1). In the present specific example, the output image signal has three output levels corresponding to the three values "0", "0.5" and "1.0" of the output image intensity Ox(m, n) as indicated above. Therefore, u=3, and x=1, 2, whereby two intensity error values E1(k1, l1) and E2(k2, l2) are available, for example. This applies to Ax(m, n), Wx(kx, lx), Ox(m, n) and other parameters described below. In this example, the two weighting matrices W1 and W2 used for E1 and E2 to obtain A1 and A2, respectively, are identical to each other as indicated in FIG. 6. That is, the distribution of weights in the matrix W1 is the same as that in the matrix W2. However, different weighting matrices W1 and W2 may be used. Further, the number of the neighboring picture elements whose intensity error values E1(k1, l1) and E2(k2, l2) are used to obtain the weighted average intensity errors A1(m, n), A2(m, n) is not limited to "12" and may be smaller or larger than "12".

The two average error values A1(m, n) and A2(m, n) obtained in step S120 corresponds to two converted image intensity values Px(m, n) obtained in step S130, namely, P1(m, n) and P2(m, n) in this example. In step S130, the converted image intensity values Px(m, n) are obtained by dividing the original image intensity I(m, n) at the picture element (m, n) under consideration, into a plurality of fractions Px, which correspond to respective equal divisions "B" of the maximum value "D" of the original intensity I(m, n). Number "S" of the equal divisions "B" of the maximum original intensity "D" is equal to (u −1), namely, (3−1) =2 in this specific example. Accordingly, the two converted image intensity values P1(m, n) and P2(m, n) corresponding to two divisions "B" are obtained in this example, as indicated at (a) and (d) in FIG. 7. Since the maximum original intensity value "D" is "1.0" in the present example, the magnitude of each division "B" is equal to "0.5" (=D/S=½). This value "0.5" of the two divisions "B" is used as a threshold with which the original intensity value I(m, n) is compared, as described below.

If I(m, n)≧0.5, then $$P1(m, n)=I(m, n)-0.5 \quad (5)$$

$$P2(m, n)=0.5 \quad (6)$$

This case is indicated at (b) and (d) in FIG. 7.
If I(m, n)<0.5, then $$P1(m, n)=0 \quad (7)$$

$$P2(m, n)=I(m, n) \quad (8)$$

This case is indicated at (c) and (d) in FIG. 7.

Thus, the original intensity value I(m, n) is divided into the first fraction P1(m, n)=I(m, n)−0.5 and the second fraction P2(m, n)=0.5 in the first case, and into the first fraction P1(m, n)=0 and the second fraction P2(m, n)=I(m, n) in the second case.

Then, the control flow goes to step S140 in which two corrected intensity values Q1 and Q2 are obtained on the basis of the average accumulated intensity values A1(m, n) obtained in step S120 and the converted image intensity values P1(m, n) and P2(m, n) obtained in step S130, according to the following equations (9) and (10):

$$Q1(m, n)=A1(m, n)+P1(m, n) \quad (9)$$

$$Q2(m, n)=A2(m, n)+P2(m, n) \quad (10)$$

It will be understood from the above equations (9) and (10) that each of the two converted image intensity values P1(m, n) and P2(m, n) obtained from the original intensity value I(m, n) at the picture element (m, n) under consideration is subjected to compensation according to the principle of the "minimized average error" technique so as to minimize the accumulated error between the original image intensity I(m, n) and the output image intensity O(m, n).

Step S140 is followed by step S150 in which each of the two corrected intensity values Q1, Q2 is compared with a threshold T, which is equal to "B/2"=0.5/2=0.25, as indicated at (e) in FIG. 7.

If Qx(m, n)≧0.25, the control flow goes to step S160 to set the divided intensity value Rx(m, n) to "0.5". If Qx(m, n)<0.25, then the control flow goes to step S170 to set divided intensity value Rx(m, n) to "0". In this example, two divided intensity values R1(m, n) and R2(m, n) corresponding to the two corrected intensity values Q1(m, n) and Q2(m, n) obtained in step S140 are obtained in steps S150, S160 and S170.

Thus, the divided intensity values Rx(m, n) may be either "0" or "0.5" which may be different from the corresponding corrected intensity values Qx(m, n). That is, there may be the intensity error Ex(m, n) between Rx(m, n) and Qx(m, n), which is calculated in the following step S180 according to the following equation (11):

$$Ex(m, n)=Qx(m, n)-Rx(m, n) \quad (11)$$

Then, the control flow goes to step S190 in which the output image intensity O(m, n) at the picture element (m, n) under consideration is obtained on the basis of the divided intensity values Rx(m, n). In the present example, the output image intensity O(m, n) is obtained as follows:

$$O(m, n)=R1(m, n)+R2(m, n) \tag{12}$$

The thus obtained output image intensity O(m, n) is stored at the corresponding position in the RAM 12 as part of the output image signal, which has three levels corresponding to the output intensity values "0", "0.5" and "1.0". In the present example, the output intensity value O(m, n) is equal to "0", "0.5" and "1.0" in the following cases, respectively: when the two divided intensity values R1(m, n) and R2(m, n) are both "0"; when one of the two divided intensity values R1(m, n) and R2(m, n) is "0.5"; and when the values R1(m, n) and R2(m, n) are both "0.5".

As indicated above, step S190 is followed by step S200 to increment the variable "m" to shift the picture element (m, n) under consideration along the row in question. That is, the picture element in the next column but in the same row will be considered, unless the variable "m" exceeds mMAX. To this end, step S210 is implemented to determine whether m.mMAX. If m.mMAX, the control flow returns to step S120, and repeat steps S120–S210 for obtain the output image intensity O(m, n) at the next picture element.

Steps S120–S210 are repeatedly implemented until a negative decision (NO) is obtained in step S210, that is, until the variable "m" exceeds the upper limit mMAX, namely, until the pointer in the video RAM 7 goes out of the right end of the dot matrix of the source image. If the negative decision (NO) is obtained in step S210, the control flow goes to step S220 to increment the variable "n" and reset the variable "m" to "0", for designating the first picture element in the next row (i.e., the picture element in the first column and second row). Step S220 is followed by step S230 to determine whether the variable "n".nMAX. If an affirmative decision (YES) is obtained in step S230, that is, if .nMAX , the control flow goes back to step S120 and repeat steps S120–S210 until the variable "m" exceeds the upper limit mMAX, that is, until the output image intensity values O(m, n) are obtained for all the picture elements in the second row. Then, step S220 is again implemented to increment the variable "n" to repeat steps S120–S210 until the output image intensity values O(m, n) are obtained for all the picture elements in the third row. Thus, steps S120–S230 are repeatedly implemented until the variable "n" exceeds the upper limit nMAX, that is, until the output image intensity values O(m, n) are obtained for all the picture elements of the source image. If a negative decision (NO) is obtained in step S230, the control flow goes to step S240 to terminate the scanning of the video RAM 7, and then to step S250 in which the output image signal representing the output image intensity values O(m, n) for all the picture elements is read from the RAM 6, and sent to the desired output device or devices, that is, ink-jet printer 2 and/or optical display 10, and/or the external memory device 12. The image processing routine of FIG. 2 is thus completed.

While the manner of obtaining the output image signal O(m, n) has been described of the picture element which is preceded by at least 14 neighboring picture elements whose intensity error values Ex(kx, lx) have been previously calculated, some modification should be made for the first twelve picture elements since the number of the neighboring picture elements is less than 12. For these first twelve picture elements, the average accumulated intensity error Ax(m, n) may be obtained for all the picture elements which precede the picture element under consideration, for example. However, other suitable special rules may be employed for the first twelve picture elements.

Although the illustrated embodiment is adapted to obtain two corrected image intensity values Q1(m, n) and Q2(m, n) corresponding to the two equal divisions "B" of the maximum original intensity "D", three or more corrected image intensity values Qx(m, n) may be obtained, depending upon the number "u" of the output levels of the output image signal O(m, n). For instance, four correct image intensity values Q1(m, n) . . . Q5(m, n) corresponding to the four equal divisions "B" may be obtained where the output image intensity O(m, n) has five output levels (e.g., "0", "0.25", "0.5", "0.75" and "1.0"). In this case, the threshold value T used in step S150 is equal to "0.125".

While the maximum original intensity "D" is divided into two equal divisions "B" in the illustrated embodiment as indicated at (a) in FIG. 7, the maximum original intensity "D" may be divided into unequal divisions or may include unequal divisions. For instance, the upper division "B" in the example indicated at (a) in FIG. 7 may be further divided into unequal divisions for which suitably determined different threshold values T are used for the corrected image intensity values Qx(m, n) corresponding to those unequal divisions.

It is to be understood that the present invention is not limited to the details of the illustrated embodiments, and the modifications indicated above, and that the invention may be embodied with various other changes, modifications and improvements, which may occur to those skilled in the art, without departing from the spirit and scope of the invention defined in the following claims.

What is claimed is:

1. An image reproducing apparatus for reproducing a source image, wherein an original intensity value determined on the basis of an intensity at each picture element under consideration of said source image is quantized to one of two levels by comparison of said original intensity value with a threshold value, using a minimized average error technique wherein an intensity error between said original intensity value and said one of two levels influences quantization of original intensity values at other picture elements in the neighborhood of each picture element under consideration, said apparatus comprising:

dividing means for dividing said original intensity value at each picture element under consideration, into a plurality of fractions; and quantizing means for quantizing each of said plurality of fractions to one of two levels, with said minimized average error technique being practiced for each fraction.

2. An image reproducing apparatus according to claim 1, wherein said dividing means obtains said plurality of fractions which correspond to respective divisions of a maximum value possible of said original intensity value.

3. An image reproducing apparatus according to claim 2, wherein said respective divisions are equal divisions of said maximum value possible of said original intensity value.

4. An image reproducing apparatus according to claim 2, wherein said respective divisions comprise unequal divisions of said maximum value possible of said original intensity value.

5. An image reproducing apparatus according to claim 1, further comprising an optical display device for displaying an output image according to said one of two levels obtained by said quantizing means for each of said plurality of fractions of said original intensity value at each picture element under consideration.

6. An image reproducing apparatus according to claim 1, further comprising a recording device for producing an output image on a recording medium according to said one of two levels obtained by said quantizing means for each of said plurality of fractions of said original intensity value at each picture element under consideration.

7. An image reproducing apparatus according to claim 6, wherein said recording device comprises an ink-jet printer capable of jetting an droplet of an ink corresponding to each picture element under consideration, such that a size of said droplet is variable in a plurality of steps.

8. An image reproducing apparatus according to claim 1, further comprising:

an image reader generating gray scale data representative of the intensity at each picture element under consideration of said source image; and converting means for converting said gray scale data into said original intensity value within a predetermined range.

9. An image reproducing apparatus according to claim 8, wherein said converting means converts said gray scale data into said original intensity value according to a linear relationship between said intensity at each picture element under consideration and said original intensity value.

10. An image reproducing apparatus according to claim 8, wherein said converting means converts said gray scale data into said original intensity value according to a non-linear relationship between said intensity at each picture element under consideration and said original intensity value.

11. An image reproducing apparatus according to claim 1, wherein said quantizing means comprises:

weighting means for giving predetermined weights to respective said other picture elements in the neighborhood of each picture element under consideration;

averaging means for obtaining a weighted average of the intensity errors at said other picture elements, by using said predetermined weights, for each of said plurality of fractions;

converting means for obtaining a sum consisting of (a) each of said plurality fractions of said original intensity value at each picture element under consideration and (b) said weighted average of the intensity errors obtained by said averaging means for each fraction, and quantizing said sum into one of two predetermined quantities by comparison of said sum with a predetermined threshold value; and calculating means for calculating said one of two levels, on the basis of a sum of the quantities obtained by said converting means for said plurality of fractions of said original intensity value at each picture element under consideration.

12. An image reproducing apparatus according to claim 11, wherein said weighting means uses a same weighting matrix which define a set of predetermined weights, for each of said plurality of fractions of said intensity value at each picture element under consideration.

13. An image reproducing apparatus according to claim 11, wherein said weighting means uses different weighting matrices which define respective different sets of predetermined weights, respectively for said plurality of fractions of said original intensity value at each picture element under consideration.

14. A method of reproducing a source image, wherein an original intensity value determined on the basis of an intensuty at each picture element under consideration of said source image is quantized to one of two levels by comparison of said original intensity value with a threshold value, using a minimized average error technique wherein an intensity error between said original intensity value and said one of two levels influences quantization of original intensity values at other picture elements in the neighborhood of each picture element under consideration, said method comprising the steps of:

dividing said original intensity value at each picture element under consideration, into a plurality of fractions; and quantizing each of said plurality of fractions to one of two levels, with said minimized average error technique being practiced for each fraction.

15. A process according to claim 14, wherein said step of dividing said original intensity value comprises obtaining said plurality of fractions which correspond to respective divisions of a maximum value possible of said original intensity value.

* * * * *